United States Patent
Moore et al.

(10) Patent No.: US 10,142,234 B1
(45) Date of Patent: Nov. 27, 2018

(54) MEMORY PAGE INDEXING DATA STRUCTURE

(71) Applicant: NetApp, Inc., Sunnyvale, CA (US)

(72) Inventors: Joseph Moore, Wichita, KS (US); William Delaney, Wichita, KS (US); Jeff Stilger, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 21 days.

(21) Appl. No.: 15/590,622

(22) Filed: May 9, 2017

Related U.S. Application Data

(60) Provisional application No. 62/404,007, filed on Oct. 4, 2016.

(51) Int. Cl.
*G06F 3/06* (2006.01)
*G06F 17/30* (2006.01)
*H04L 12/743* (2013.01)
*H04L 9/08* (2006.01)
*H04L 29/06* (2006.01)
*H04L 12/753* (2013.01)

(52) U.S. Cl.
CPC .... *H04L 45/7457* (2013.01); *G06F 17/30625* (2013.01); *H04L 9/0836* (2013.01); *H04L 45/48* (2013.01); *H04L 63/20* (2013.01); *G06F 2212/1052* (2013.01)

(58) Field of Classification Search
CPC .. G06F 17/30327; G06F 3/067; G06F 3/0608; G06F 12/0868; G06F 17/30091; G06F 17/30949; G06F 3/0626; G06F 3/0643; H04L 63/061; H04L 63/06; H04L 63/10; H04L 63/062
See application file for complete search history.

(56) References Cited

U.S. PATENT DOCUMENTS

| | | | | |
|---|---|---|---|---|
| 6,694,323 | B2* | 2/2004 | Bumbulis | G06F 17/30327 |
| 7,933,885 | B1* | 4/2011 | Lambiri | G06F 17/30327 |
| | | | | 707/706 |
| 9,971,526 | B1* | 5/2018 | Wei | G06F 3/0619 |
| 2007/0094313 | A1* | 4/2007 | Bolotin | G06F 17/30625 |

OTHER PUBLICATIONS

Hyeontack Lim, et al, "Practical batch-updatable external hashing with sorting," In Proc. Meeting on Algorithm Engineering and Experiments, Jan. 2013, 10 pgs.
Hyeontack Lim, et al, "SILT: A memory-efficient, high-performance key-value store," In Proc. 23$^{rd}$ ACM Symposium on Operating Systems Principle (SOSP), Cascais, Portugal, Oct. 2011, 26 pgs.

* cited by examiner

*Primary Examiner* — Mohamed A Kamara
(74) *Attorney, Agent, or Firm* — Haynes and Boone, LLP

(57) ABSTRACT

A method, a computing device, and a non-transitory machine-readable medium for indexing data on a storage server are provided. A method includes providing, by a storage server, a plurality of sorted keys. A subset of the plurality of sorted keys that include a bit prefix is stored on a memory page. A trie representation is constructed that includes an entry corresponding to the memory page, wherein a position of the entry in the trie representation is determined based on a binary value of bits of the bit prefix. The trie representation is traversed, by the storage server, to access a record stored in the memory page, wherein the record corresponds to a key having the bit prefix.

20 Claims, 4 Drawing Sheets

MEMORY PAGE INDEXING DATA STRUCTURE

CROSS-REFERENCE TO RELATED APPLICATIONS

This application claims priority to U.S. Provisional Application No. 62/404,007, filed on Oct. 4, 2016, which is incorporated herein by reference in its entirety.

TECHNICAL FIELD

The present description relates to data storage systems, and more specifically, to systems and methods for indexing data in a data storage system.

BRIEF DESCRIPTION OF THE DRAWINGS

The present disclosure is best understood from the following detailed description when read with the accompanying figures.

DETAILED DESCRIPTION

Figure 1:
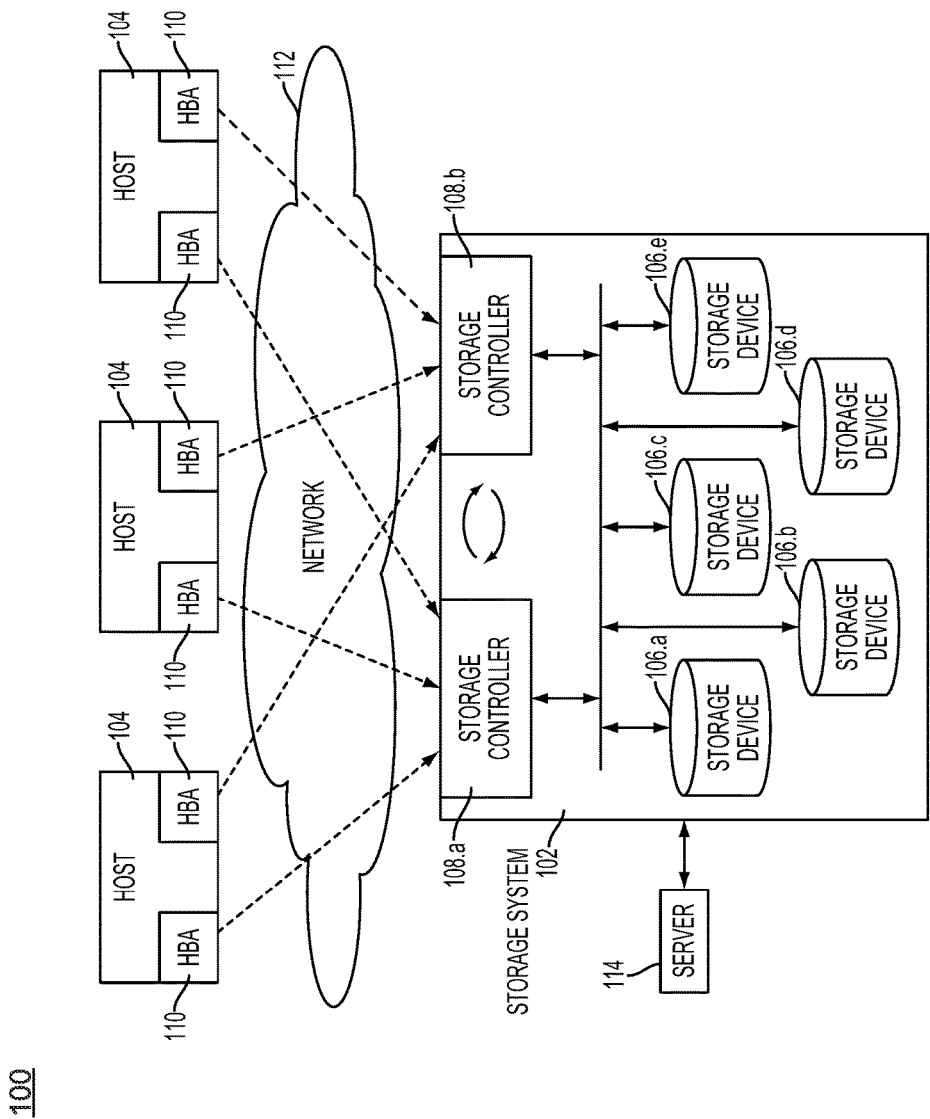
FIG. 1 is an organizational diagram of an exemplary data storage architecture according to aspects of the present disclosure.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

Various embodiments include systems, methods, and machine-readable media for indexing data on a storage server. As described herein, a storage controller sorts a plurality of keys and stores the plurality of keys in memory pages. The storage controller assigns each memory page a unique bit prefix and stores keys having that bit prefix in the associated memory page. The storage controller maps each key to a record, such as by storing each key in a memory page as a key-record pair. Accordingly, records are associated with the keys in the memory pages. The storage controller then generates a representation of a trie data structure that indexes the memory pages according to the bit prefixes assigned to the memory pages. The storage controller receives keys as inputs in requests from hosts and traverses the representation to determine memory pages that store the keys. The storage controller then accesses the located memory pages to retrieve the corresponding records that are associated with the keys.

The embodiments disclosed herein provide many advantages. First, indexing the keys in the trie representation by providing a node for each memory page (a page-granular model) offers a significant advantage over indexing the keys in the trie representation by providing a node for each key (a key-granular model). For example, with a packing factor of 408 keys per memory page, a page-granular model offers a memory efficiency improvement over a key-granular model by a factor of $(1+\log_2 (408))/1.5$, or 6.44. Second, in addition to improving memory efficiency of the trie representation itself, a trie representation that is generated using a page-granular model offers greater compression efficiency than a trie that is generated using a key-granular model. For example, a trie representation that is generated using a page-granular model may be more balanced and shallow than a key-granular trie. Thus, after compressing the trie representation using techniques such as entropy-coding, the trie representation generally may have its memory footprint reduced by a factor of between three and four. Thus, the size of the compressed trie representation may yield a memory efficiency improvement by a factor of twenty over key-granular models. Of course, it is understood that these features and advantages are shared among the various examples herein and that no one feature or advantage is required for any particular embodiment.

FIG. 1 illustrates a data storage architecture 100 in which various examples may be implemented. Specifically, and as explained in more detail below, one or both of the storage controllers 108.*a* and 108.*b* read and execute computer readable code to perform the methods described further herein to index memory pages in a trie representation according to bit prefixes of the keys stored by the memory pages, and search the memory pages to access records associated with the keys.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions from one or more of the hosts 104 and take an action such as reading, writing, or otherwise accessing the requested data. These data transactions may include host read requests to read data from the storage system 102 and/or host write requests to write data to the storage system 102. For many exemplary transactions, the storage system 102 returns a response such as requested data and/or a status indictor to the requesting host 104. It is understood that for clarity and ease of explanation, a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes at least one processor such as a microcontroller or a central processing unit (CPU) operable to perform various computing instructions that are stored in at least one memory. The instructions may, when executed by one or more processors, cause the one or more processors to perform various operations described herein with the storage controllers 108.*a*, 108.*b* in the storage system 102 in connection with examples of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 for storing data and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some examples, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various examples. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In the present example, storage controllers 108.a and 108.b are arranged as a high availability pair. Thus, when storage controller 108.a performs a write operation for a host 104, storage controller 108.a may also sends a mirroring I/O operation to storage controller 108.b. Similarly, when storage controller 108.b performs a write operation, it may also send a mirroring I/O request to storage controller 108.a. Each of the storage controllers 108.a and 108.b has at least one processor executing logic to process host read requests, host write requests, and garbage collection tasks according to examples of the present disclosure.

Moreover, the storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size. In an example, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), to name just a few examples. These configuration actions described with respect to server 114 may, alternatively, be carried out by any one or more of the other devices identified as hosts 104 in FIG. 1 without departing from the scope of the present disclosure.

With respect to the hosts 104, a host 104 includes any computing resource that is operable to exchange data with storage system 102 by providing (initiating) data transactions to the storage system 102, such as by providing host read requests and host write requests to the storage system 102. In an exemplary example, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various examples, the HBAs 110 include Serial Attached SCSI (SAS), iSCSI, InfiniB and, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many examples, a host 104 may have multiple communicative links with a single storage system 102 for redundancy. The multiple links may be provided by a single HBA 110 or multiple HBAs 110 within the hosts 104. In some examples, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Figure 2:
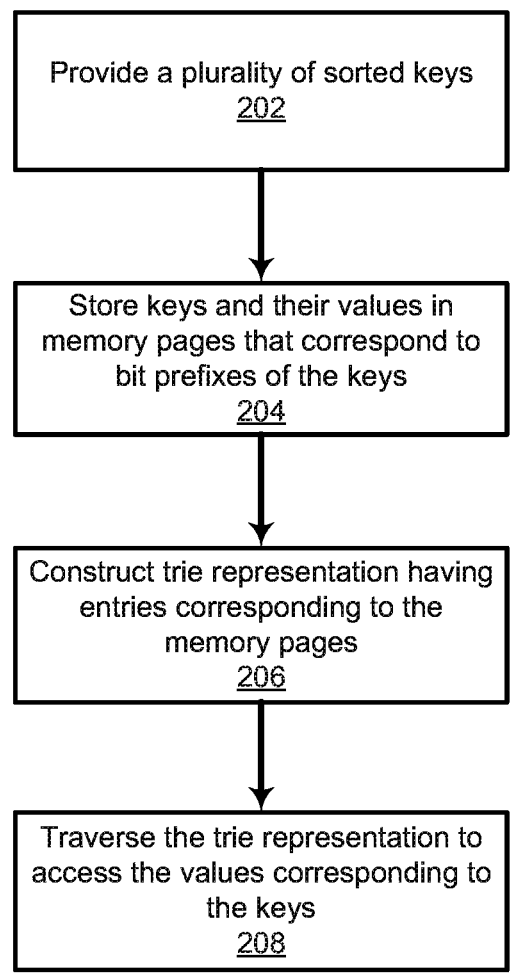
FIG. 2 is a flow diagram of a method for generating a representation of a trie data structure that indexes memory pages according to the bit prefixes of the keys stored in the memory pages, according to aspects of the present disclosure.
Figure 3:
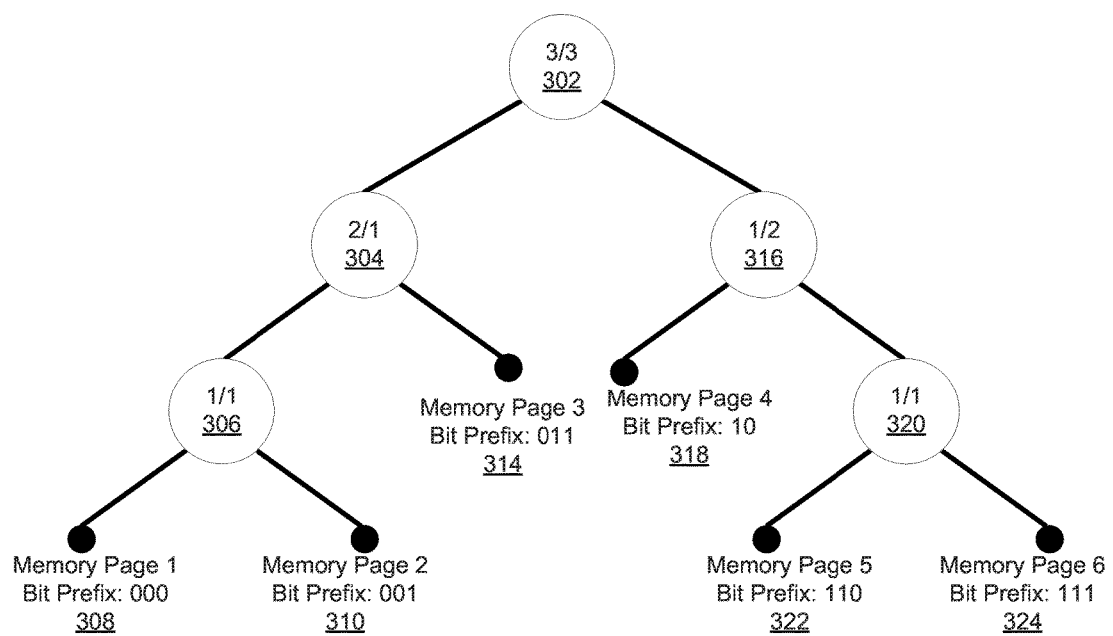
FIG. 3 is an organizational diagram of an exemplary trie representation, according to aspects of the present disclosure.
Figure 4:
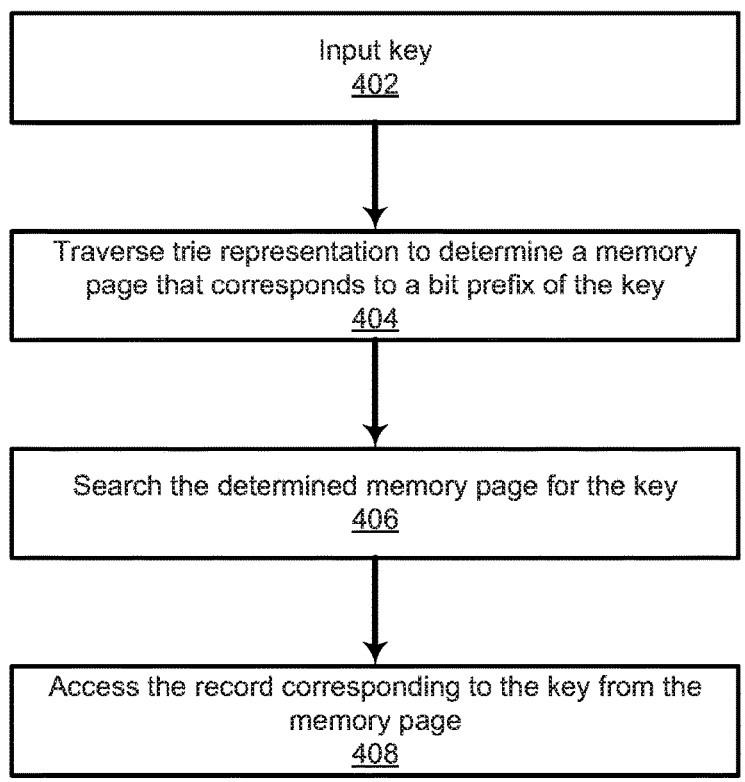
FIG. 4 is a flow diagram of a method for traversing a representation of a trie data structure to access a record corresponding to a key, according to aspects of the present disclosure.

The storage controllers 108.a and 108.b store the data in the storage system 102 in data records. These data records are associated with extent identifiers that are used as keys to locate the records in memory pages and access the records on behalf of the hosts 104. In some examples, keys have a size of 48 bits and each record has a size of 20 bytes. In some examples, there may be hundreds of billions of records. Thus, in the present example, the keys are stored in memory pages that are assigned to store keys having particular high-order bits. Moreover, the memory pages are indexed in a trie representation, which may be compressed to reduce the memory footprint of the stored indexing structure. FIGS. 2-4 that are provided below discuss in more detail the generation of the trie representation and the traversing of the trie representation to locate the records that correspond to the keys.

FIG. 2 illustrates a method 200 for generating a representation of a trie data structure that indexes memory pages according to the bit prefixes of the keys stored in the memory pages, according to aspects of the present disclosure. In an example, the method 200 may be implemented by one or more processors of one or more of the storage controllers 108 of the storage system 102, executing computer-readable instructions from one or more computer-readable media to perform the functions described herein. In the description of FIG. 2, reference is made to a storage controller (e.g., storage controller 108.a and/or 108.b) for simplicity of illustration, and it is understood that other storage controller(s) may be configured to perform the same functions when performing a processing task. It is understood that additional steps can be provided before, during, and after the steps of method 200, and that some of the steps described can be replaced or eliminated for other examples of the method 200.

At block 202, the storage controller provides a plurality of sorted keys. The plurality of sorted keys may include keys that are extracted from multiple data stores. For example, a storage system may provide a first data store that includes a first portion of data that has been recently written, a second data store that includes older data, and a third data store that includes the oldest data. Data may be migrated between the multiple data stores based on recency and/or frequency of data accesses. In some examples, the first data store includes keys and their corresponding records that are stored using LogStore techniques. In some examples, the second data store includes keys and their corresponding records that are stored using HashStore techniques. In some examples, the third data store includes keys and their corresponding records that are stored using trie representation techniques. Accordingly, keys may be retrieved from one or more data stores and sorted.

In the present example, the storage controller sorts keys according to the bits in the binary representations of the keys. As discussed previously, each key may be an extent identifier that is associated with a record. The storage controller parses each bit in the binary representations of the keys to order the keys based on the values of the bits. In some examples, the parsing by the storage controller proceeds in order from most significant bits of the keys to the least significant bits. As an example, a first key may have a binary representation of '1011'. A second key may have a binary representation of '0111'. A third key may have a binary representation of '0101'. These keys may be sorted according to their bit values by parsing the most significant bit of each key, which may be the left-most bit. Accordingly, a '1' is parsed from the first key, and a '0' is parsed from the second and third keys. The second and third keys may be ordered prior to the first key, based on the value of '0' being less than the value of '1'. Next, the second most significant bit may be parsed from the second and the third keys. Accordingly, a '1' may be parsed from the second and the third keys. Because the value is the same for both keys, the third bit may then be then parsed from the second and the third keys. Accordingly, a '1' is parsed from the second key and a '0' is parsed from the third key. Because the value of '0' is less than the value of '1', the third key may be ordered prior to the second key. Thus, the keys may be provided in a bit sorted order as follows: '0101' (third key); '0111' (second key); '1011' (first key).

This is a simple example to help understand sorting of keys. In other examples, there may be hundreds of billions of keys having any number of bits (e.g., 48 bits per key). Accordingly, the sort algorithm described above or other sorting algorithms may be performed to provide a sorted ordering of keys based on the bit values of the binary representations of the keys. In some examples, the keys are sorted using a recursive algorithm.

At action 204, the keys and their corresponding records are stored in memory pages based on the bit prefixes of the keys. Each memory page is associated with a bit prefix, which may include one or more bits. The bit prefix associated with each memory page is unique, such that no two memory pages store keys that include a same bit prefix. The bit prefix corresponds to a high-order bit portion of the keys stored in each memory page. Thus, the bit prefix corresponds to the most significant bit (with respect to the sorted order). For example, a memory page that is associated with the '111' bit prefix may store keys having '111' in their high-order bit portion. In another example, for keys having a length of four bits, the keys '1110' and '1111' may be stored in a memory page that is associated with the '111' bit prefix. In yet another example, for keys having five bits, a memory page associated with a '111' bit prefix may store the '11100', '11101', '11110', and '11111' keys. These are merely examples and other key lengths and bit prefix lengths may also be used.

In the present example, the keys and their corresponding records are stored in the memory pages. For example, each key and its corresponding record may be stored as a key-record pair in a memory page. In more detail, the keys may be stored in the memory pages sequentially, with each key being followed by its corresponding record. Each key may be of a first fixed size (e.g., 48 bits), and each record may be of a second fixed size (e.g., twenty bytes). Accordingly, the storage controller may distinguish between keys and records based on the offsets where the data is stored on each memory page. For example, the storage controller may recognize that the first 48 bits of the memory page correspond to a first key, and the 20 bytes following the first key corresponds to a first record that is associated with the key. The storage controller may recognize that the next 48 bits following the first record correspond to a second key, and so forth.

The keys and records may be stored in each memory page until the end of the memory page is reached. When the end of the memory page is reached, the memory page may be split into multiple memory pages by assigning a first portion of the keys and records to a first split memory page and a second portion of the keys and records to a second split memory page. Each of the split memory pages may be assigned to a different portion of the bit prefix that was assigned to the original memory page. For example, if a bit prefix of the original memory page was '111', the original memory page may store keys that begin with '1111' as well as keys that begin with '1110'. After the original memory page is split, a first split memory page may be assigned to store keys beginning with '1110' and a second split memory page may be assigned to store keys beginning with '1111'. Thus, the keys and their corresponding records may be stored on two memory pages instead of one when a memory page size limit is reached.

Continuing the previous examples discussed with respect to action 202, the '0101' (third key) may be stored on a first memory page that is associated with the '010' bit prefix, the '0111' (second key) may be stored on a second memory page that is associated with the '011' bit prefix, and the '1011' (first key) may be stored on a third memory page that is associated with the '10' bit prefix.

At action 206, a trie representation is constructed that has entries corresponding to the memory pages. The trie representation organizes the entries of the memory pages according to the bit prefix associated with each memory page. In some examples, the trie representation may include a trie, such as the exemplary trie representation illustrated in FIG. 3. An example of organizing the memory pages in the exemplary trie representation is described in more detail with respect to FIG. 3. In other examples, the trie representation is a compressed data structure that corresponds to a trie. For example, the storage controller may store the bit prefixes of the memory pages as an array, and input the array into a SortedStore algorithm to construct the trie representation. The trie representation may also include compressed representations of a trie that may have reduced memory footprint. For example, techniques such as entropy coding and Huffman tables may be applied to generate an Entropy Coded Trie (ECT).

At action 208, responsive to the storage controller receiving a request for data, the storage controller parses a key from the request. The storage controller traverses the trie representation to determine a memory page that corresponds to the bit prefix of the key. Once the memory page is determined, the storage controller searches the determined memory page for the key and performs the requested data access on the record corresponding to the key. For example, if the request is a read request, the record may be read from the memory page. An example of traversing of the trie representation to access records is described in more detail with respect to FIG. 4.

FIG. 3 illustrates an exemplary trie representation 300, according to aspects of the present disclosure. In some examples, the trie representation is generated and traversed by one or more storage controllers (e.g. storage controllers 108.a and 108.b) according to the techniques described with respect to FIGS. 2 and 4. Of course, it is understood that this is merely an exemplary trie representation, and that other data structure representations may be used. In some examples, the trie representation is stored in a memory of a storage controller, such as a Dynamic Random-Access Memory (DRAM).

The exemplary trie representation 300 includes a leaf node for each memory page that stores the keys. In this example, the root node and each intermediary node are encoded with a value that indicates a number of leaf nodes on a left sub-trie and a number of leaf nodes on a right sub-trie. For example, the exemplary trie representation includes a root node 302 that indicates by the 3/3 value that there are three leaf nodes in its left sub-trie and three leaf nodes in its right sub-trie. These values indicate the number of memory pages that are assigned to store keys in each sub-trie.

The left sub-trie having a root node 304 corresponds to memory pages that are assigned to store keys that have a '0' as the first bit of their bit prefixes. The right sub-trie having a root node 316 corresponds to memory pages that are assigned to store keys that have a '1' as the first bit of their bit prefixes. There may be any number of levels, which may be generated based on the number of bit prefixes in the trie representation, each bit prefix corresponding to a memory page. Similarly, the second level corresponds to the second bit of the bit prefixes and the third level corresponds to the third bit of the bit prefixes. Moreover, as discussed with respect to root nodes 304 and 316, a left sub-trie corresponds to a bit value of '0', while a right sub-trie corresponds to a bit value of '1'.

The node 304 indicates that it has two leaf nodes in its left sub-trie and one leaf node in its right sub-trie. Traversing again to the left sub-trie, node 306 indicates that it has one leaf node to the left and one leaf node to the right. Turning now to the leaf nodes, leaf node 308 corresponds to memory page 1 and is associated with keys having a bit prefix of '000'. The bit prefix may be determined by counting a number of left branches followed to arrive at the leaf node. Thus, three lefts were taken to arrive at leaf node 308, which provides a bit prefix of '000'. Accordingly, the storage controller may identify memory page 1 as storing keys beginning with the bit prefix of '000'.

Similarly, the storage controller traverses to leaf node 310 by following two left branches and then a right branch. As previously discussed, a left branch corresponds to a bit value of '0'. A right branch corresponds to a bit value of '1'. Because leaf node 310 is reached by traversing two left branches and then a right branch, the bit prefix associated with memory page 2 is '001'. Accordingly, the storage controller may identify memory page 2 as storing keys beginning with the bit prefix of '001'.

Node 304 indicates that there is one leaf node to the right. The storage controller may traverse the trie to reach the right leaf node 314 by traversing one left branch and then one right branch. Accordingly, the storage controller may identify memory page 3 as storing keys beginning with the bit prefix of '01'.

Node 316 indicates that there is one leaf node to the left and two leaf nodes to the right. The storage controller may traverse the trie to reach the left leaf node 318 by traversing one right branch and then one left branch. Accordingly, the storage controller may identify memory page 4 as storing keys beginning with the bit prefix of '10'.

Node 320 indicates that there is one leaf node to the left and one leaf node to the right. The storage controller may traverse the trie to reach the left leaf node 322 by traversing two right branches and then one left branch. Accordingly, the storage controller may identify memory page 5 as storing keys beginning with the bit prefix of '110'. The storage controller may traverse the trie to reach the right leaf node 324 by traversing three right branches. Accordingly, the storage controller may identify memory page 6 as storing keys beginning with the bit prefix of '111'.

As illustrated in the above trie representation, the offset for each memory page is increased from left to right. Accordingly, by traversing the trie representation, the storage controller may identify that memory page 1 corresponds to a far left leaf node 308, memory page 2 corresponds to the next left-most leaf node 310, memory page 3 corresponds to the next left-most leaf node 314, memory page 4 corresponds to the next left-most leaf node 318, memory page 5 corresponds to the next left-most leaf node 322, and memory page 6 corresponds to the next left-most leaf node, which is also the far right leaf node 324.

The trie representation discussed above is an exemplary representation. It is understood that there may be any number of leaf nodes, each corresponding to a memory page, that the trie may be organized differently to specify other bit prefixes, and that the offsets of the memory pages may be identified in other ways. Moreover, other trie representations may be used to index the memory pages. In some examples, a trie representation includes an Entropy Coded Trie (ECT).

FIG. 4 illustrates a method 400 for traversing a representation of a trie data structure to access a record corresponding to a key, according to aspects of the present disclosure. In an example, the method 400 may be implemented by one or more processors of one or more of the storage controllers 108 of the storage system 102, executing computer-readable instructions from one or more computer-readable media to perform the functions described herein. In some examples, method 400 is implemented to perform action 208 that is described with respect to FIG. 2. It is understood that additional steps can be provided before, during, and after the steps of method 400, and that some of the steps described can be replaced or eliminated for other examples of the method 400.

At action 402, the storage controller receives a key from a host computing device. In the present example, the key includes an extent identifier that corresponds to the record that the host computing device is attempting to access, such as by a read or a write request. While in the present example an extent identifier is used as the key, in other examples other storage identifiers may be used to locate records. For example, block identifiers, blob identifiers, and so forth may be used as keys that correspond to records.

At action 404, the storage controller traverses a trie representation to determine a memory page assigned to store keys that have the same bit prefix as the input key. In some examples, the storage controller traverses the trie representation by following a left or right branches in the trie representation based on whether each bit in the bit prefix of the key is a '0' or a '1'. As previously described, the bit prefix may include one or more of the high-order bits of the key and the traversals of the branches may proceed in order of most significant bit of the high-order bits to least significant bit. For example, as described with respect to FIG. 3, a left branch may be followed from the root node if a first bit is a zero and a right branch may be followed if a first bit is a '1'. The next branch decision may then be determined based on a value of a second bit in the key, and so forth. Moreover, as described with respect to FIG. 3, other trie representation may also be used such as an ECT. Accordingly, the trie structures may be traversed in different ways, based on the particular trie structure used.

In some examples, once the leaf node corresponding to the bit prefix of the key is reached, the storage controller may read a memory page offset from the leaf node to identify the particular memory page that stores the key. In other examples, the storage controller may determine the memory page offset by determining a position of the memory page's node in the trie. For example, as described with respect to FIG. 3, a far left node in the trie representation may correspond to a first memory page. The offset of the memory page may be increased in a left-to-right ordering. Thus, the storage controller may determine a position of a memory page node relative to one or more other nodes to determine the offset of the memory page. In some examples, the memory page offset corresponds to a memory page number. For example, as shown in FIG. 3, offset 0 may correspond to memory page 1; offset 1 may correspond to memory page 2, and so forth.

At action 406, the storage controller accesses the memory page that stores the keys having a same bit prefix as the input key.

At action 408, the storage controller accesses the record corresponding to the located key in the memory page. In some examples, the key is stored as a key-record pair, and so the memory page may access the record that is paired with the key. In the present example, the record is a record that a host has requested to access for a read or write operation. Accordingly, the storage controller may access the record to perform the requested read or a write access.

A technique for optimizing the memory footprint occupied by the memory pages and/or trie representation used to index the memory pages includes modifying the packing factor (PF), which represents a total number of keys that may be stored on each memory page. In some examples, the bit prefixes assigned to the memory pages are determined by the storage controller dynamically selecting between PF values to improve the packing rate (PR), which represents the average amount of keys that are stored in each memory page. For example, there may not be enough keys that have a particular bit prefix to fill a memory page. If this occurs over many memory pages, there may be a large amount of wasted storage space. Generally, as the average number of keys assigned to the memory pages increase, the memory efficiency also increases because the amount of unused portions in the memory pages is decreased. In cases where sub-optimal packing is a concern, the storage controller may switch between PF factors. For example, a PF may be selected based on the total number of keys stored in the memory pages. Specifically, if the number of keys divided by 408 is greater than or equal to a power of 2, and also less than 1.4× the same power of 2, then a PF of 306 may be selected. Otherwise, a PF of 408 may be selected. The packing factor relates directly to the page size.

Another technique that may be implemented to reduce processing time for generating a trie representation includes performing single-pass counting. Single pass counting may improve computation of sizes of left and right sub-tries by reducing redundancy. In some examples, to encode each node in a trie representation with a number of leaf nodes in its left and right sub-tries, the number of leaf nodes is counted by aggregating the number of memory pages that have a zero in the bit prefix position that is characteristic of the trie that is being encoded. That count is the size of the left sub-trie, while the remainder of the memory pages in the trie subset correspond to the size of the right sub-trie. This counting method is expensive in terms of memory access cost and computation burden as the counting may be repeated for each node in the trie. As an optimization, the counting may be performed in a single pass by constructing a table and filling counted values into the table. Thus, entries may be retrieved from the table to reduce processor and memory costs. As an exemplary pseudo-code, the table may be constructed by the storage controller creating an array that has a size of $2^L$, where L is a number of levels of the trie. The storage controller may initialize a position to zero. The storage controller may then perform a loop that increments the position by one for each iteration of the loop. Each iteration of the loop may retrieve the bits of a key between the position and a value that corresponds to the number of levels. Then, the storage controller may add an entry to the array that is equal to the current value of the position.

After the table is created, it may be accessed to retrieve sub-trie size computations by performing two lookups of the table. The first lookup uses a table index formed by placing a value of the bit-wise prefix string into the high-order bit positions of the table index, and padding the lower-order bit positions with zero. This yields a number of keys having values that are less than the prefix value in the top bit positions. The second table lookup uses an index value that is formed by extending the prefix value with ones and using the lengthened prefix as the high order bits of the index value. The result is a number of keys having values that are less than or equal to the extended prefix. Subtracting the second retrieved value from the first yields the size of the left sub-trie having the prefix value.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   providing, by a storage server, a plurality of sorted keys;
   storing a first subset of the plurality of sorted keys on a first memory page, wherein the first subset of the plurality of sorted keys include a first bit prefix;
   storing a second subset of the plurality of sorted keys on a second memory page, wherein the second subset of the plurality of sorted keys include a second bit prefix that is different than the first bit prefix;
   constructing a trie representation that includes a first entry corresponding to the first memory page and a second entry corresponding to the second memory page, wherein a position of the first entry in the trie representation is determined based on a binary value of a bit of the first bit prefix, and wherein a position of the second entry in the representation is determined based on a binary value of a bit of the second bit prefix; and
   traversing the trie representation, by the storage server, to access a record stored in the first memory page, wherein the record corresponds to a key having the first bit prefix.

2. The method of claim 1, wherein providing the plurality of sorted keys includes:
   extracting a plurality of keys from a plurality of data stores;
   parsing bits in binary representations of the plurality of keys; and
   sorting the plurality of keys according to the bits in the binary representations.

3. The method of claim 2, wherein one or more of the plurality of sorted keys are selected for extraction from the plurality of data stores based on at least one of a recency or frequency of data access.

4. The method of claim 1, wherein the key and the record are stored in the first memory page as a key-record pair.

5. The method of claim 1, wherein the trie representation comprises an Entropy Coded Trie (ECT).

6. The method of claim 1, wherein the trie representation includes a node that indicates an amount of leaf nodes in the node's left sub-trie and an amount of leaf nodes in the node's right sub-trie, and wherein each leaf node corresponds to a memory page that stores keys and records.

7. The method of claim 1, wherein the key includes an extent identifier that corresponds to the record.

8. A non-transitory machine readable medium having stored thereon instructions for performing a method comprising machine executable code which when executed by at least one machine, causes the at least one machine to:
   provide, by a storage server, a plurality of sorted keys;
   store a first subset of the plurality of sorted keys on a first memory page, wherein the first subset of the plurality of sorted keys include a first bit prefix;
   store a second subset of the plurality of sorted keys on a second memory page, wherein the second subset of the plurality of sorted keys include a second bit prefix that is different than the first bit prefix;
   construct a trie representation that includes a first entry corresponding to the first memory page and a second entry corresponding to the second memory page, wherein a position of the first entry in the trie representation is determined based on a binary value of a bit of the first bit prefix, and wherein a position of the second entry in the representation is determined based on a binary value of a bit of the second bit prefix; and
   traverse the trie representation, by the storage server, to access a record stored in the first memory page, wherein the record corresponds to a key having the first bit prefix.

9. The non-transitory machine readable medium of claim 8, wherein providing the plurality of sorted keys includes:
   extracting a plurality of keys from a plurality of data stores;
   parsing bits in binary representations of the plurality of keys; and
   sorting the plurality of keys according to the bits in the binary representations.

10. The non-transitory machine readable medium of claim 8, wherein one or more of the plurality of sorted keys are selected for extraction from the plurality of data stores based on at least one of a recency or frequency of data access.

11. The non-transitory machine readable medium of claim 8, wherein the key and the record are stored in the first memory page as a key-record pair.

12. The non-transitory machine readable medium of claim 8, wherein the trie representation comprises an Entropy Coded Trie (ECT).

13. The non-transitory machine readable medium of claim 8, wherein the trie representation includes a node that indicates an amount of leaf nodes in the node's left sub-trie and an amount of leaf nodes in the node's right sub-trie, and wherein each leaf node corresponds to a memory page that stores keys and records.

14. The non-transitory machine readable medium of claim 8, wherein the key includes an extent identifier that corresponds to the record.

15. A computing device comprising:
   a memory containing machine readable medium comprising machine executable code having stored thereon instructions for performing a method of data indexing; and
   a processor coupled to the memory, the processor configured to execute the machine executable code to cause the processor to:
      provide, by a storage server, a plurality of sorted keys;

store a first subset of the plurality of sorted keys on a first memory page, wherein the first subset of the plurality of sorted keys include a first bit prefix;

store a second subset of the plurality of sorted keys on a second memory page, wherein the second subset of the plurality of sorted keys include a second bit prefix that is different than the first bit prefix;

construct a trie representation that includes a first entry corresponding to the first memory page and a second entry corresponding to the second memory page, wherein a position of the first entry in the trie representation is determined based on a binary value of a bit of the first bit prefix, and wherein a position of the second entry in the representation is determined based on a binary value of a bit of the second bit prefix; and traverse the trie representation, by the storage server, to access a record stored in the first memory page, wherein the record corresponds to a key having the first bit prefix.

16. The computing device of claim 15, wherein providing the plurality of sorted keys includes:

extracting a plurality of keys from a plurality of data stores;

parsing bits in binary representations of the plurality of keys; and sorting the plurality of keys according to the bits in the binary representations.

17. The computing device of claim 15, wherein one or more of the plurality of sorted keys are selected for extraction from the plurality of data stores based on at least one of a recency or frequency of data access.

18. The computing device of claim 15, wherein the key and the record are stored in the first memory page as a key-record pair.

19. The computing device of claim 15, wherein the trie representation comprises an Entropy Coded Trie (ECT).

20. The computing device of claim 15, wherein the key includes an extent identifier that corresponds to the record.

* * * * *